United States Patent [19]
Woodward

[11] 3,768,985
[45] Oct. 30, 1973

[54] LIQUID INTERFACE DIFFUSION BONDED TITANIUM

[75] Inventor: James R. Woodward, El Cajon, Calif.

[73] Assignee: Rohr Industries, Inc., Chula Vista, Calif.

[22] Filed: Dec. 29, 1969

[21] Appl. No.: 888,501

Related U.S. Application Data

[63] Continuation-in-part of Ser. No. 765,156, Oct. 4, 1968.

[52] U.S. Cl. .................................... 29/191, 29/484
[51] Int. Cl. ............................................... B32b 3/12
[58] Field of Search ..................... 29/191, 183, 180, 29/194, 198; 75/134 C

[56] References Cited
UNITED STATES PATENTS

| | | | |
|---|---|---|---|
| 3,442,010 | 5/1969 | Albers | 29/198 X |
| 3,455,663 | 7/1969 | Zdanuk | 29/198 |
| 2,816,355 | 12/1957 | Herman | 29/183 X |
| 2,962,811 | 12/1960 | Herbert | 29/183 X |
| 3,401,025 | 9/1968 | Whitney | 29/191 |
| 3,417,461 | 12/1968 | Wells et al. | 29/198 X |
| 2,906,008 | 5/1953 | Boegehold et al. | 29/194 |

Primary Examiner—L. Dewayne Rutledge
Assistant Examiner—E. L. Weise
Attorney—George E. Pearson

[57] ABSTRACT

Fitted titanium members or articles are joined, face to fitted face, by a diffusion bonding process in which a small amount of brazing type material is interposed between said faces, which material, when rendered liquidus by heat, forms between the faying surfaces a liquid interface and resultant diffusion bridge which accelerates atomic diffusion of the basis materials across the bonded joint. The bonding cycle includes an initial period during which the interface material is rendered liquidus, followed by a diffusion period during which atomic diffusion occurs across the bridge provided by the interface material. The resultant bonded joint is characterized by atomic mixing and grain growth of the basis materials across the joint, and diffusion and dilution of the interface materials with the basis materials in the region of the joint.

1 Claim, 20 Drawing Figures

PATENTED OCT 30 1973  3,768,985
SHEET 1 OF 5

INVENTOR.
J. R. WOODWARD
BY
ATTORNEY

INVENTOR.
J. R. WOODWARD

BY

*George E. Pearson*
ATTORNEY

INVENTOR.
J. R. WOODWARD
ATTORNEY

INVENTOR.
JAMES R. WOODWARD
BY
George E. Pearson
ATTORNEY

LIQUID INTERFACE DIFFUSION BONDED TITANIUM

This is a continuation in part of pending U.S. Pat. application Ser. No. 765,156, filed Oct. 4, 1968, for Combined Brazing-Diffusion Method of Bonding Metallic Honeycomb Sandwich Panel Structure, by the same applicant, and assigned to the same assignee, as the present application.

BACKGROUND OF THE INVENTION

Brazing and diffusion bonding methods for the joining of honeycomb sandwich panel and other titanium structures have heretofore been known and separately used with some degree of success, but have not been found to be entirely satisfactory in service for reasons hereinafter set forth.

The brazing method requires fusion of a filler metal or alloy which upon becoming molten flows by capillary action into the ever present voids along the faying surfaces of the metal parts to be joined. There is no fusion of the basis metals themselves. The brazing process thus adds another filler metal, or metals, to the basic metal system to effect a joint therebetween. This added metal not only often flows to surface areas other than those required to effect the brazed joint, but also significantly adds to the weight of the brazed structure. For example, an added weight of 80 grams per square foot of honeycomb sandwich panel using 2 mls. brazing alloy foil is common.

Filler metals which do not rapidly diffuse into the base metal are considered to be non-reactive; those which rapidly diffuse into the basis metal being considered reactive. The filler metal or alloy has a melting point much lower than that of the metal of the parts being joined, and these lower melting fillers often react with the basis metal with resultant degradation of its properties. Titanium, for example, is difficult to braze because it is highly reactive with most filler metals. In many cases those filler metals which do not significantly affect the basis metal properties do not have the characteristics required to fully utilize design properties such as corrosion resistance, high temperature strength, and toughness, which properties are normally obtained from mechanisms formed of the basis metals.

Diffusion bonding generally describes a solid state joining process in which no fusion is involved, no deleterious foreign material is added, and the joint is made only by self diffusion or solid state reactions of the component materials under conditions of cleanliness, temperature and pressure. The metal to metal contact, essential to the process, is made by plastic deformation of the components, usually effected by creep or yield stress control. After the contact is made under ultraclean conditions, solid state diffusion takes place. The problem of establishing metal to metal contact under the ultraclean requirements is significant. To obtain contact by creep, however, requires time, while cleanliness degrades with time. Establishing metal to metal contact by yield or plastic flow is often impractical.

SUMMARY OF THE INVENTION

In accordance with the present invention, a combined brazing and diffusion process, hereinafter sometimes referred to as the liquid interface diffusion (LID) process, for the bonding of various structures, particularly those formed of titanium, is provided which substantially obviates the problems of the prior art diffusion bonding processes while retaining the advantages thereof. Specifically, a small amount of one or more selected metals is interposed between the faying surfaces to be bonded and is rendered liquidus at the brazing temperature to form between the faying surfaces a liquid interface which establishes the required metal to metal contact therebetween so that atomic transport can be effected and diffusion accelerated. The metal to metal diffusion bridge operable at reduced temperature and time to thus enhance the conditions for post diffusion bonding of the basis metals and dilution of the braze material across and within the bonded joint after elevation of the braze materials to their liquidus temperature has been accomplished. The combined brazing-diffusion process thus involves the steps of heating the assembly of parts to be bonded to the liquidus temperature of the diffusion bridge material followed by post atomic diffusion at reduced temperature to effect atomic transport and grain growth of the basis materials across the bonded joint and dilution by diffusion of the bridge material within the joint.

Interposition of the bridge material between the faying surfaces to be bonded preferably is accomplished by placement of a thin layer of the selected metal, metals, or alloy in laminar form on at least one of the faying surfaces to be bonded. This placement may be accomplished by any suitable means, such as by brush or dip chemical or electroplating, vapor deposition, and powder flame spray, of which dip immersion electroplating is preferred.

The materials used as the liquid interface are selected in view of metallurgical considerations, and, depending on the basis material, may form a nonreactive melt, or when reacted with the substrate may form a low melting phase, a eutectic or minimum, or an allotropic transformation. The primary purpose of this interface is to establish the requisite metal to metal contact and resultant diffusion bridge between the faying surfaces so that atomic transport is effected and the post solid state diffusion is accelerated whereby a stabilized diffusion bonded joint is achieved rapidly and fillets are also formed to augment the desirable properties of the joined structure such as resistance to fatigue and shear and flatwise tensile strength.

Various means may be employed to fixture the assembly of components preparatory to bonding of the same by the combined brazing-diffusion process of the present invention. For example, various arrangements for developing differential pressure may be employed of which a pressure pillow-hard vacuum arrangement is preferred. Other arrangements include the use of a vacuum pressure-rarified argon arrangement and the use of thermal differential expansion such as disclosed in Thomas A. Herbert U.S. Pat. No. 3,128,734 for "Apparatus for Making Curved Sandwich Panels."

Various means may be employed to apply the heat, such as, for example, by use of air, atmosphere or hard vacuum furnaces, radiation heaters such as quartz lamps or gas burners, or integral electrical resistance heaters such as disclosed and claimed in Thomas A. Herbert U.S. Pat. Nos. 2,984,732 and 3,033,973, both entitled "Apparatus and Method for Brazing Honeycomb Sandwich Panels." Of these, heating in a hard vacuum is preferred.

Effective cleaning of the titanium surfaces to be joined is an important phase of the overall plating and combined brazing-diffusion bonding of the invention, and this preferably is accomplished by cleaning baths such as disclosed in Earl W. Kendall U.S. Pat. Nos. 3,228,816 for "Process for Cleaning and Polishing Aluminum and its Alloys" and 3,379,645 for "Process and Composition for Removing Protective Paint Films." The plating of the titanium preferably is accomplished by methods and baths such as disclosed and claimed in Earl W. Kendall application for patent, Ser. No. 765,155, filed Oct. 4, 1968, for "Method of Plating Titanium and its Alloys," which includes an electrolytic activator composition disclosed and claimed in Earl W. Kendall patent application, Ser. No. 600,372, filed Dec. 9, 1966, for "Electrolytic Descaling of Titanium and its Alloys."

PURPOSE OF THE INVENTION

A primary object of the present invention is to provide by means of a liquid interface a new and improved method of forming a stablized diffusion bonded joint between fitted members or articles of titanium.

The foregoing purpose, features and advantages of the invention will become more fully apparent as the description proceeds, reference being had to the accompanying drawings wherein:

Figure 1:
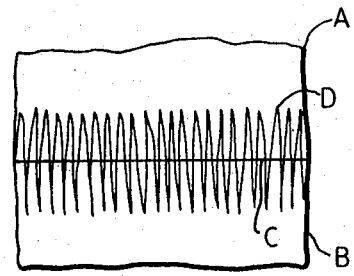
FIG. 1 is a graphic representation of the diffusion bonding of parts under ideal conditions.
Figure 2:
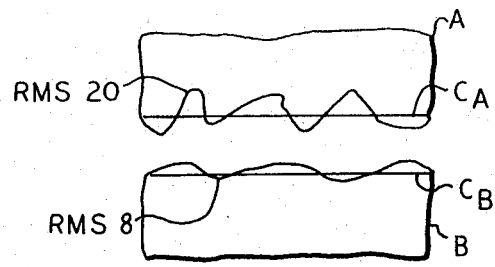
FIG. 2 is a micrographic showing of the true surface condition of real parts.

Reference is now directed to the drawings, and first more particularly to FIGS. 1 and 2, for a more complete understanding of the invention.

In the theoretical showing of FIG. 1, it is assumed that parts A and B are perfectly flat and clean and fit together perfectly along their common surface or interface C. Under such ideal conditions, the spacing between the parts would be compatible with the interatomic distances between metal atoms, and instantaneous bonding of parts would occur without requiring atomic diffusion. Actually the parts are neither perfectly flat nor clean. As shown, in FIG. 2, where in micrographic portions of parts A and B are shown at many times magnification, the actual RMS 20 surface condition of part A deviates considerably from its nominal flat surface $C_A$, and the actual RMS 8 surface condition of part B also deviates from its nomial flat surface $C_B$. In order to achieve diffusion bonding as represented at D in FIG. 1, it normally becomes necessary to establish an ultraclean condition of the parts, and to employ high pressure and temperature for extended periods of time without causing gross deformation and degradation of mechanical properties which might result from use of excessive time, temperature, or pressure.

According to prior art methods, diffusion bonding may be considered fast or slow. So called "rapid" methods utilize resistance welding equipment or the like to achieve bonding within seconds, or fractions thereof, and are yield-stress controlled, that is, they utilize pressures which exceed the material strength at bonding temperature. The so called "slow or long-time" processes, such as autoclave pressure bonding which may require many hours to achieve bonding, are described as creep controlled in that extended time is required to establish metal to metal contact across the interfacial voids before atomic diffusion can begin. The rapid processes require ultraclean surface conditions, but because of the short exposure times and high pressure engagement of the parts, the bonded parts are less subject to physical property damage due to the presence of atmospheric impurities. The slow processes, by contrast, are not so critical with respect to surface cleanliness but require a protective atmosphere or hard vacuum to prevent contamination and loss of properties.

Figure 3:
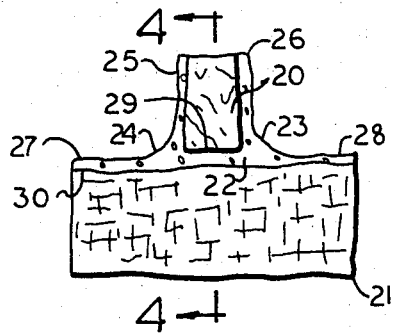
FIG. 3 is a micrographic showing of a typical brazed joint.
Figure 4:
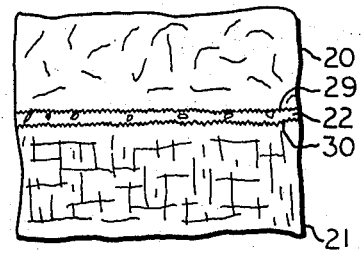
FIG. 4 is a sectional view as seen along the line 4—4 of FIG. 3.

A typical brazed joint of a honeycomb panel sandwich structure is disclosed in FIGS. 3 and 4 from which it may be seen that the honeycomb core wall 20 is joined to the facing sheet 21 by the brazing alloy 22 which desirably forms the joint strengthening fillets 23 and 24, but also often forms the undesired extended regions 25, 26 and 27, 28 which excessively add to the weight of the panel structure. The braze alloy actually adds an additional component to the joined assembly, and this component often lacks the desired physical properties of the basis materials.

Figure 5:
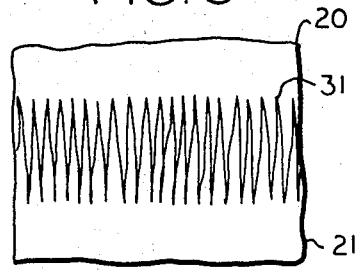
FIG. 5 is a graphic representation of the condition of complete dilution of the braze filler shown in FIG. 4.

The zigzag lines 29 and 30 depicted in FIGS. 3 and 4 at the interface of the braze alloy 22 with the core 20 and with the facing sheet 21 represent a condition in which more or less of the brazing material, as an incidence of the brazing operation, has diffused into the basis materials or has reacted therewith. A condition in which all of the braze alloy either fully reacted with the basis materials or has become diluted therewithin is represented at 31 in FIG. 5 as providing an undesirable zone in which degradation of the physical properties of the sandwich panel structure has occurred.

Figure 6:
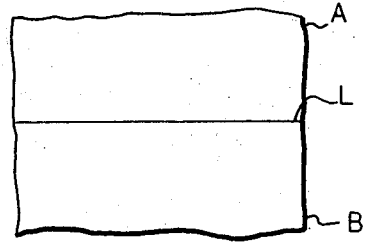
FIG. 6 is a graphical showing of the liquid interface and diffusion bridge at the faying surfaces of parts to be bonded in accordance with the process of the present invention.
Figure 7:
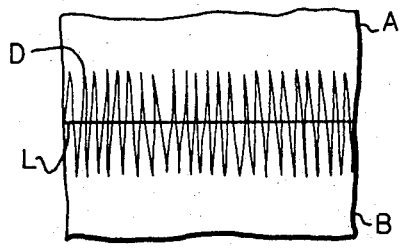
FIG. 7 is a graphical representation of the atomic diffusion and atom transport of the basis materials effected by the diffusion bridge of FIG. 6.
Figure 8:
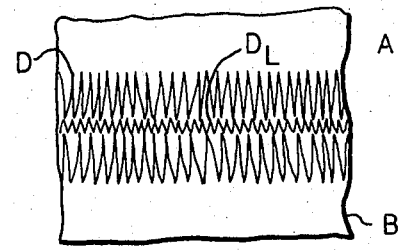
FIG. 8 is a graphical representation of the atom transport of FIG. 7 and additionally showing dilution of the bridge materials.

FIGS. 6 to 8 graphically represent features and resultant effects characteristic of the combined brazing-diffusion bonding process of the present invention and the bonded joint produced thereby. In FIG. 6, the line L represents a liquid interface at the faying surfaces of parts A and B which fills the interfacial voids, depicted in FIG. 2 at the surfaces of these parts, so that metal to metal contact, essential for the diffusion bonding, is established. This liquid interface is formed in the brazing phase of the instant liquid interface diffusion (LID) process by the placement of a small amount of brazing material on the engaging surface of at least one of the parts to be brazed and heating of the assembly of parts and interposed brazing material to the liquidus temperature of the brazing material.

When the liquid interface and resultant diffusion bridge has become established, atomic diffusion takes place as depicted at D in FIG. 7, that is, atom transport of the basis materials of parts A and B occurs across the bonded joint represented by the liquid interface L. This diffusion occurs in what is referred to as the secondary or post diffusion phase of the LID process which is operated at a temperature reduced from the liquidus temperature of the braze materials. Also occurring during this diffusion phase is the dilution by diffusion of the liquid interface or diffusion bridge material L into the region of the diffusion joint D as depicted at $D_L$ in FIG. 8.

Although not limited thereto, the LID process of the present invention is particularly well suited to the bonding of honeycomb sandwich panel structures formed of titanium and its alloys. The micrograph of FIG. 13 discloses, at about 2500 times magnification, a diffusion bonded joint between the core sidewall 32 and its facing sheet 33 of a sandwich panel structure formed of commercially pure (C.P.) titanium. This titanium panel was bonded by the LID process in accordance with the time-temperature and time-vacuum curves disclosed in FIG. 12. The micrograph clearly evidences atomic transport and resultant grain growth of the basis titanium materials across the bonded joint between the core sidewall and its facing plate. The micrograph, in the region of the joint, also clearly evidences dilution of the bridge materials therewithin, that is, dilution of the liquid interface materials which, in the instance of this example, constituted a dual laminar electrolytic plating of tin and silver on the face of the honeycomb core. The tin was the first plating layer and the silver the second plating layer, which layers respectively constituted 3.1 percent and 96.9 percent of the laminar placement. This placement layer increased the weight of the panel structure by 0.027 gram per square inch. The micrograph further clearly evidences the formation of fillets 34 and 35.

The surfaces of titanium, due to the presence of oxides and other films, are in a passive state and therefore are not receptive to the placement of a metallic plating thereon. These films cannot be easily removed by acid attack and, accordingly, the plating of titanium has heretofore been considered difficult to accomplish. As disclosed and claimed in the aforementioned copending application of Earl W. Kendall, Ser. No. 765,155, filed Oct. 4, 1968, for Method of Plating Titanium and Its Alloys, use of the electrolytic activator bath disclosed therein so treats and conditions the titanium surfaces that it has become possible to successfully plate titanium with metals such as Ag, Au, Cu, Ni, Sn, In, Zn, Cr, Co, Cd, Fe, Rh, Re, Sb, and other metals.

Reference is directed to this copending application for further details of the plating bath and process. It suffices herein to state that the titanium articles to be plated are first immersed in a suitable cleaner to remove surface contaminants such as mill marks, finger prints, soils, oils, etc. A solution which is effective for the purpose is available commercially as Brantner 1315 and is substantially the same composition as disclosed and claimed in U.S. Pat. No. 3,379,645 of Earl W. Kendall, assigned to the assignee of the instant application. Brantner 1315 is a non-aqueous cleaner operative at ambient room temperature of 70° to 90° F. and consisting of from 15 – 25 grams of chromic acid ($CrO_3$) for each 175 – 225 grams of concentrated sulfuric acid (sp. gr. 1.84). A preferred composition of this cleaner solution operable for cleaning purposes herein consists of 10 grams of powdered chromic acid ($CrO_3$) for each 100 mils. of concentrated sulfuric acid (sp. gr. 1.84). This preferred solution is operative upon immersion of the titanium articles therein to remove the surface contaminants within from 1 to 5 minutes.

Figure 9:
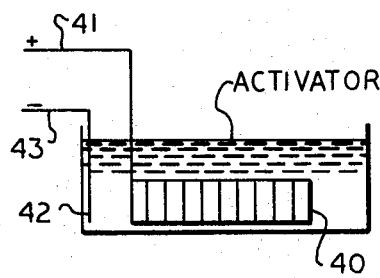
FIGS. 9 and 10 are pictorial showings of electrolytically operated activator and plating baths, respectively.

The titanium articles are next subjected to the action of the electrolytic bath disclosed in FIG. 9. This bath is basically a descaling solution effective to remove pyrolytic refractory oxides from the surfaces of titanium and ferrous alloys including such metals as nickel, chromium, cobalt, tungsten, vanadium, and molybdenum. It is available commercially as Brantner 2226 and is substantially the same composition as disclosed and claimed in the aforementioned copenidng application of Earl W. Kendall, Ser. No. 600,362, and assigned to the assignee of the instant application.

This descaling solution is operated at ambient temperature of the order of 70° to 90° F. and consists of the following constituents and proportions thereof by volume of the bath:

| | |
|---|---|
| Acetic acid (glacial) | 55 – 70% |
| Sulfuric acid (concentrated) | 20 – +% |
| Hydrofluoric acid (48–50%) | 10 – 15% |
| Inhibitor (amide-acetylenic alcohol mixture) | 0.3 – 0.5% |
| Wetting agent (anionic surfactant) | 0.2 – 0.3% |

In the preferred descaling composition, the acetic-sulfuric-hydrofluoric acid proportions are as follows by volume of the bath:

| | |
|---|---|
| Acetic Acid (Glacial) | 70% |
| Sulfuric Acid (Concentrated) | 20% |
| Hydrofluoric Acid (70%) | 10% |

As disclosed in FIG. 9, the titanium part, for example, core 40, is the anode in the electrolytic system, the positive (+) lead 41 being connected thereto. The cathode 42, which is immersed in the descaling bath, is connected to the negative (−) lead 43. The cathode electrode 42 may be formed either of carbon or copper.

The descaling bath is used to prepare the titanium articles for the brazing-diffusion bonding process aforesaid, and provides the requisite stringent surface clean conditions required for these brazing and solid state diffusion operations. The descaling bath also serves to activate the core 40 to render the same receptive to the plating operation, subsequently to be described. Thus, the panel facing skins are subjected to the electrolytic action of the bath of FIG. 9 by immersion therein for 5 to 10 minutes with 2 − 3 volts applied across the input leads 41$^{(+)}$ and 43$^{(-)}$. The core 40, which must additionally by sufficiently activated to receive and hold the plating to be applied to its edge faces, is immersed in the activator bath of FIG. 9 for 5 to 10 minutes with 4–5 volts applied across the input leads 41$^{(+)}$ and 43$^{(-)}$.

Prior to plating the activated core 40, it is preferred to brighten the surface thereof by immersion in a suitable brightener bath to remove any smut or other surface conditions which may result from the action of the activator bath. Brantner 2226B is commercially available and is preferred. Brantner 2226B is substantially the same composition as disclosed and claimed in the aforementioned U.S. Pat. No. 3,228,816 of Earl W. Kendall, which patent is assigned to the assignee of the instant application. This brightener solution is an aqueous bath and operates for purposes herein at ambient room temperature of the order of 70° − 90° F. The bath consists of the following constituents and proportions thereof per 100 mls. of aqueous solution:

0.1 − 1.0 gram urea
8 − 12 mls. nitric acid (42°B's.)(1.42 sp. gr.)
4 − 6 grams boric acid
1 − 1.5 gram ammonium bifluoride.

The preferred brightener composition consists of:
Urea —0.5 percent by weight of the aqeuous solution
Nitric Acid — 10.0% by volume of the aqueous solution
Boric Acid — 5.0% by weight of the aqueous solution
Ammonium Bifluoride — 1.0% by weight of the aqueous solution.

Figure 10:
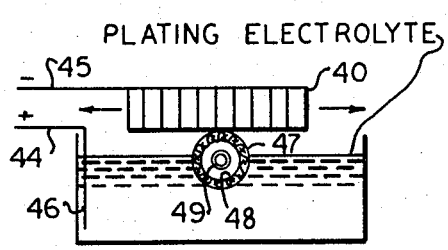

The core 40 is now ready for plating of the edge facings thereof by suitable means, such as, for example, the electroplating system of FIG. 10, wherein it will be understood that the conventional commercially available plating electrolyte has the requisite composition to apply to the faying surface or surfaces the particular metal to be plated thereon. The plating method disclosed is similar to the well known Dalic or Selectron brush type plating process, and the current and voltage supply and controls afforded by that process conveniently may be employed to energize the leads 44$^{(+)}$ and 45$^{(-)}$ of FIG. 10 as required herein to practice the plating process.

As disclosed in FIG. 10, lead 44$^{(+)}$ is connected to the anode electrode 46 which is immersed in the plating electrolyte and is insoluble therein. Lead 45$^{(-)}$ is connected directly to core 40 which is mounted over and above a roller 47 for reciprocal rolling movement of its edge faces therealong parallel to the surface of the bath as depicted by the arrows in FIG. 10. Roller 47 is immersed in the bath to a depth therein not to exceed the order of 75 percent of its diameter.

Roller 47 comprises a tube formed of polyvinyl chloride PVC) which is wrapped with a single layer 48 of gauze such as tube gauze manufactured by the Dalic Plating Process Company, the ends of the tubing gauze being tucked within the PVC tube. A glass tube 49 which is about one-half the diameter of the PVC tube is inserted therein and provides the roller bearing support for the roller, the ends of glass tube 49 being journalled in holes or notches (not shown) provided in the sidewalls of the plating tank 50.

Rolling movement of core 40 on roller 47 causes the roller to rotate and move the electrolyte picked up thereby to the core face in contact therewith, thereby to complete the current path from the electrolyte to the core. Since the core is mounted for rolling movement above the roller, the electrolyte tends to move by gravity away from the core to thus minimize any tendency of the electrolyte to move by capillary action or otherwise up and along the cell walls where plating is not desired. The plating is thus limited or restricted to the edges of the core where it is desired and where the thickness of the plating is determined by the time and current density employed.

Similar processing can be performed utilizing dip plating in tanks without the roller mechanism. In both cases (roller or dip plating) the core or component may be masked, with suitable masking material, and subsequently the maskant is removed from the faying surfaces by sanding or honing preparatory to the activating and plating.

Figure 11:
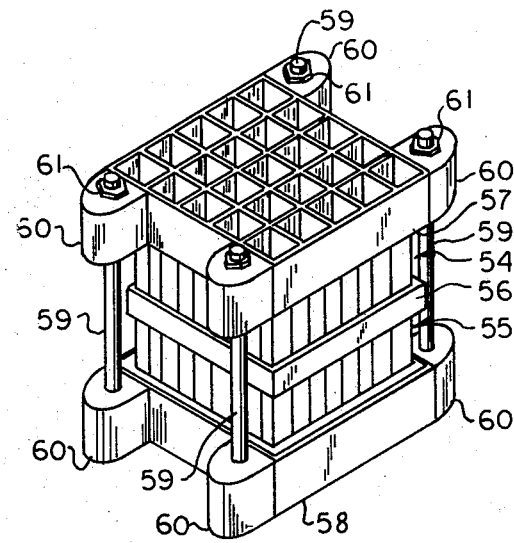
FIG. 11 is a schematic showing of a fixturing arrangement for use in practicing the brazing-diffusion bonding process of the present invention.

Referring now to FIG. 11, a suitable fixturing or tooling arrangement is disclosed for retaining the cleaned, activated and plated panel parts in assembled relation preparatory to the brazing-diffusion bonding of the same. Panel assemblies generally designated 54 and 55 may be considered to represent two assemblies each having a core and its oppositely disposed facing sheets, or each assembly may be considered to comprise two or more separate assemblies of a core and its facing sheets. In either case, assemblies 54 and 55 are disposed on opposite sides of a schematically depicted pressure device 56 for evenly distributing the panel loading thereon. Pressure device 56, referred to as a pressure pillow may be a well-known so-called pressure bag which may simply comprise two flexible metallic sheets sealed at the edges and having provision for admitting air under pressure therein. Pressure device 56 may comprise one or more sheets of flexible heat resistant dielectric cloth-like material available as "Refrasil" or "Fiberfrax." The sheets form a resilient cushion and provide an alternative arrangement to the pressure bag.

So-called "strongbacks" or reference plates 57 and 58 are disposed above and below the panel assemblies 54 and 55. These are formed as eggcrating of a suitable material such as 300 series stainless steel to provide a greater extent of thermal expansion of the eggcrating than the rods 59 which retain the same in assembled relation to the panel components, the rods being formed of a suitable material such as 400 series stainless steel which has a coefficient of thermal expansion less than that of the strongback eggcrating members. Lugs 60 are attached as by welding to the perimeters of members 54 and 55 to receive the rods which are held in clamping relation to the strongback members as by the nuts 61 in threaded engagement with the rods.

It will be understood that the showing of FIG. 11 is schematic only and that other elements such as copper heat distribution and slip sheets (not shown) are also employed in the fixturing assembly.

Upon assembly of the panel parts and fixturing as shown in FIG. 11, the same are placed in a vacuum furnace and as the heat increases toward the liquidus temperature of the braze materials on the cores, differential expansion of the strongbacks 57, 58 and rods 59 causes the requisite contact pressure to be developed between the cores and facing sheets of the panel assemblies 54 and 55. With reference to the curves of FIG. 12, this contact pressure is fully developed just prior to the braze bond phase of the brazing-diffusion bonding cycle depicted, this being at about 1,500° F. and at something less than one hour after the start of the cycle. Liquidus occurs somewhere in the neighborhood of 1,700° F. or less, and solidus occurs prior to the end of the brazing phase at above 1,500° F. and about 1½ hours after the start of the cycle. The thermally developed contact pressure continues after solidus occurs, it being augmented by the cushion or pillow.

Figure 12:
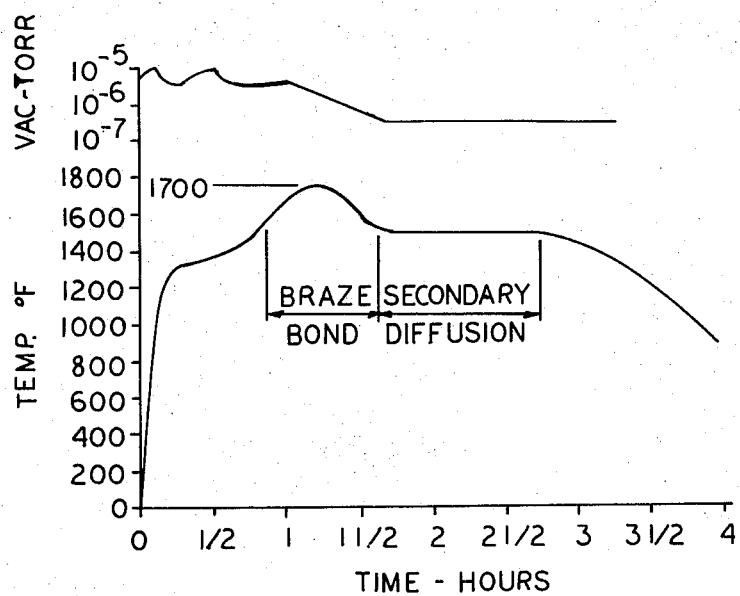
FIG. 12 is a graph showing a typical bonding cycle obtained in the practice of the combined brazing-diffusion bonding process of the present invention.
Figure 13:
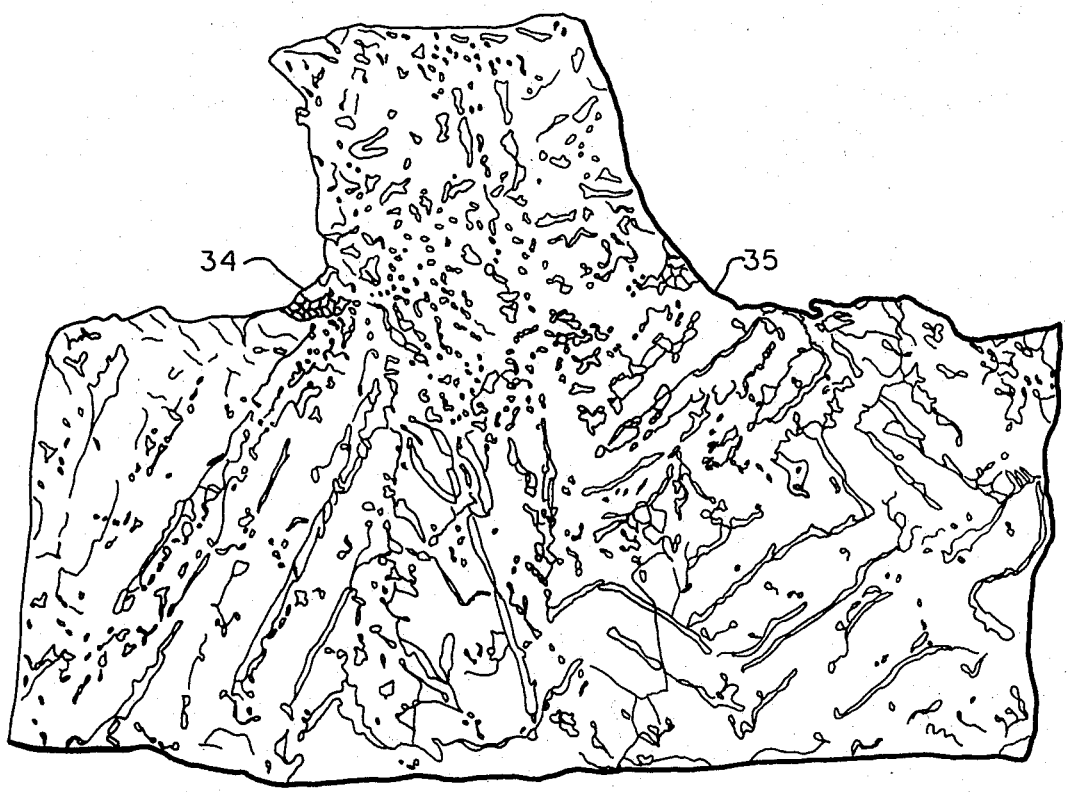
FIG. 13 is a micrograph of bonded structure produced in accordance with the bonding process of the present invention.

During the secondary diffusion phase of the cycle depicted in FIG. 12, the aforementioned solid state diffusion of the basis materials and the dilution of the diffusion bridge materials occur, this being for a period of over 1 hour and at a constant temperature of about 1,500° F. At the start of the cycle, the hard vacuum employed is of the order of $10^{-5}$ Torr and increases to and maintains a constant level upwards of about $10^{-6}$ during the secondary diffusion phase.

From the foregoing, it will be apparent that by choosing tooling materials which have different coefficients of thermal expansion than that of the basis materials, pressure and configuration may be accurately applied to the part without auxiliary systems. For example, in a simple $\Delta\alpha$ tooling system involving a round part, the system is comprised only of the part and a mandrel. There are no diaphrams, tubes, or any of the auxiliary systems required by other concepts. As the assembly is heated the mandrel expands at a higher rate than the part. By dimensional precalculation combined with component thermal sizing operations it is possible to establish the temperature at which the mandrel and part meet. The meeting point is designed to be below the brazing temperature thereby assuring contact pressure. In this example, there may be a large differential in diameters of the mandrel and part at temperatures upwards of 1,200° F. By choosing other mandrel materials this difference could be changed if desired. For example, by choosing a nickel alloy mandrel over a 300 series stainless steel mandrel the difference could be halved. However, a high differential expansion is sometimes desirable. In the case that the assumed part has a compound curvature, this requires that relatively large layup clearances be available.

In operations using $\Delta\alpha$ tooling both the heating and cooling temperature cycles require close control. For example if, on the cooling cycle, the mandrel cooled at the same rate or faster than the part, pressure on the faying surfaces could possibly be relaxed while the braze filler is liquid. However, it is nearly automatic that the part cools faster than the mandrel thereby sizing itself to the mandrel configuration to a temperature well below the solidus of the braze filler.

The $\Delta\alpha$ tooling concept may be applied to other than round parts. Nearly any differential desired can be designed into such a system by proper choice of the materials. Flat parts such as the panel assemblies 54 and 55 depicted in FIG. 11 are considered to be the hardest configuration to which to apply the $\Delta\alpha$ tooling system.

Although the $\Delta\alpha$ tooling concept requires an atmosphere (inert or hydrogen) or vacuum furnace in most cases, it has many advantages such as the following:

It is ideal for hard vacuum furnace operation
It has low mass
It has good thermal balance
It requires no auxiliary systems
It is easily purged
It may accommodate relatively large tolerance stackups
It allows reliable joint contact at braze temperatures.

The aforementioned U.S. Pat. No. 3,128,734 of T. A. Herbert, Jr., which is assigned to the assignee of the instant application, discloses and claims an arrangement in which differential thermal expansion of fixturing members is utilized in the brazing of curved sandwich panels.

Heating methods for brazing assembled structures vary widely. The methods can be generally catagorized in the following types:

1. Air furnace
2. Atmosphere furnace
3. Integral electrical resistance
4. Radiation
5. Hard vacuum furnace For the more exotic brazements, like titanium, a hard vacuum furnace is preferred. There are several reaons for this choice. The main advantage of vacuum brazing titanium is the lower oxygen contamination potential. Titanium is one of the best oxygen getter in the periodic table. If exposed to an atmosphere containing oxygen at temperatures above 1,000° F. for long periods of time (long meaning over 2 hours) it will "get" the oxygen and the substrate will become irreversibly degraded. As the temperature increases above 1,000° F. the rate of oxygen contamination is accelerated. So at brazing temperatures of 1,700° F it becomes imperative that the amount of oxygen present be minimized. Hard vacuum of less than $10^{-5}$ Torr is about the best and most practical oxygen free system available. Another important feature is keeping the cleaned titanium which has been prepared for bonding in a clean condition. If, in any part of the brazing cycle, oxygen or other impurities are allowed to contaminate the surface, braze filler flow can be severely restricted.

Figure 15:
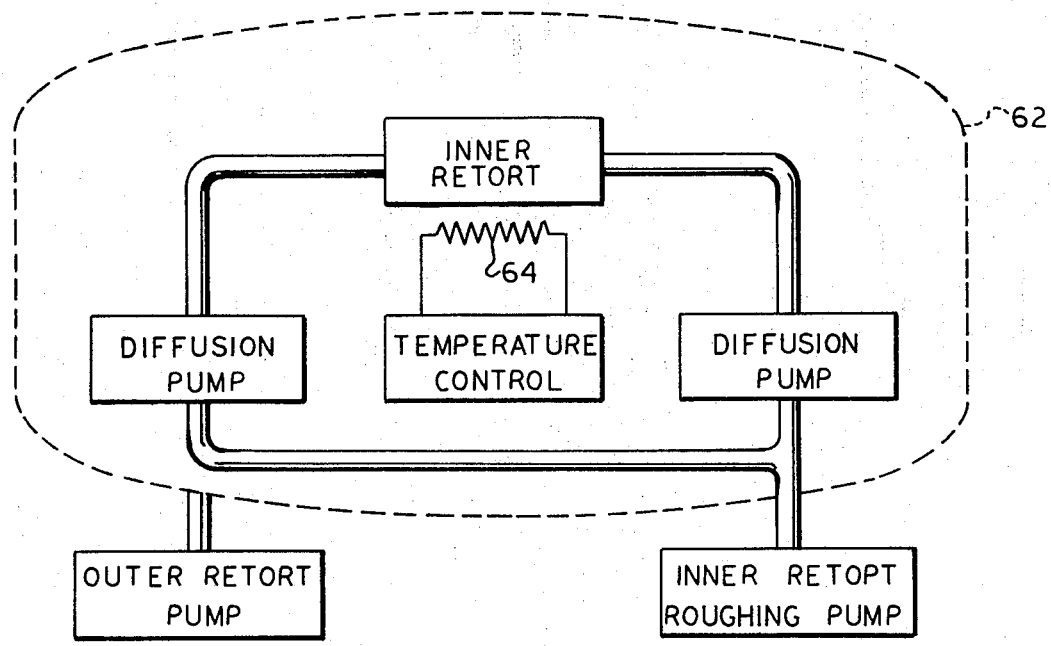
FIG. 15 is a block diagram view showing a dual vacuum differential pressure and localized heating system.

A dual vacuum brazing concept is disclosed in FIG. 15, and is more completely disclosed in U.S. Pat. application Ser. No. 852,382 Applicant Hugh M. Rush et al., filed Oct. 22, 1969 and assigned to the assignee of the present invention. This concept utilizes a series of small diffusion pumps connected in close proximity to the panel components and enclose therewith in the inner hard vacuum retort. The inner retort is housed in a large, vacuum tight bell 62, which may be pressurized with Argon. For example, with the inner retort operating in a $10^{-5}$ Torr vacuum, the bell pressure may be such that 2 psia is applied to the parts in the inner retort, this being the pressure which the parts will sustain at brazing temperature. Heating of the parts can be by resistance heating elements or quartz lamps as depicted at 64 in FIG. 15.

Figure 14:
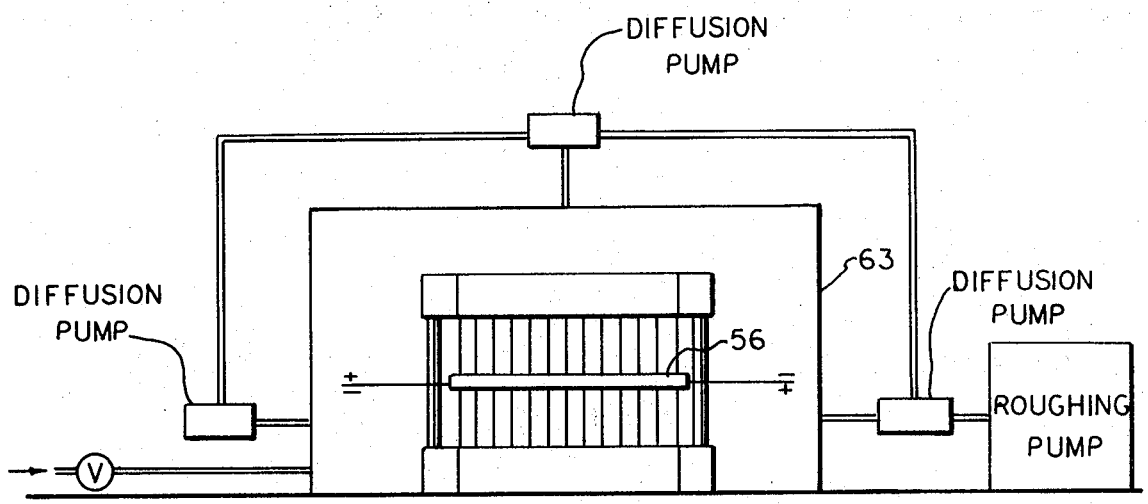
FIG. 14 is a schematic showing of a controlled environment and heating arrangement.

In the arrangement of FIG. 14, the assembly of FIG. 11 is disposed within a controlled environment provided by the chamber 63 which is pumped by the diffusion pump array and roughing pump system to provide a hard vacuum therein of the order of upwards of $10^{-5}$ Torr. In this arrangement, the device 56' is an electrical heating blanket, or the like, such as disclosed and claimed in U.S. Pat. No. 3,088,019 of R. E. Crump, which patent is assigned, in part, to the assignee of the instant application. In such a resistance heating arrangement, a flexible woven wire mesh heater element is sandwiched between sheets of Fiberfrax or Refrasil. The heater elements, of course, alternatively may be discrete nichrome ribbon elements as employed in the well known Glassrock process. In any case, such electrical heating systems employ the concept disclosed and claimed in the aforesaid U.S. Pat. Nos. 2,984,732 and 3,033,973 of T. A. Herbert and assigned to the assignee of the instant application, wherein heat is generated electrically and locally with respect to the assembled panel components to be brazed, and transferred thereto by conduction through a flexible, heat resistant, dielectric medium (Fiberfrax or Refrasil).

The valve disclosed in FIG. 14 provides a means of introducing an inert gas into the chamber 63 when this is desired, for example, after purging with the vacuum system.

Figure 16:
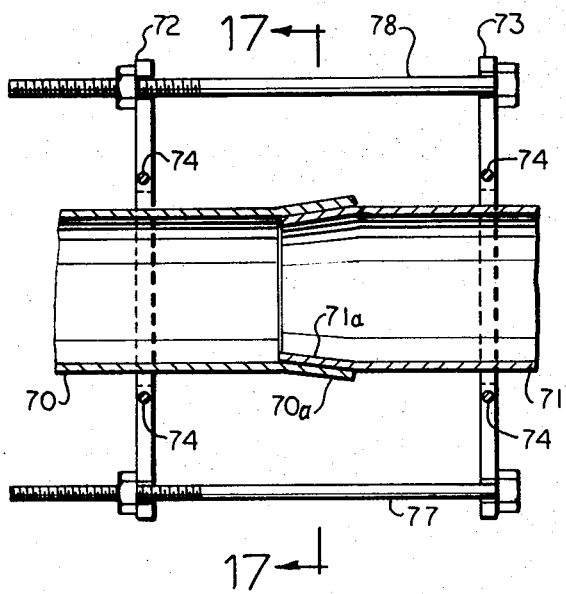
FIG. 16 is a diametrical sectional view through two titanium tubes prepared and clamped together in coaxial relation for diffusion bonding by means of the present invention.
Figure 17:
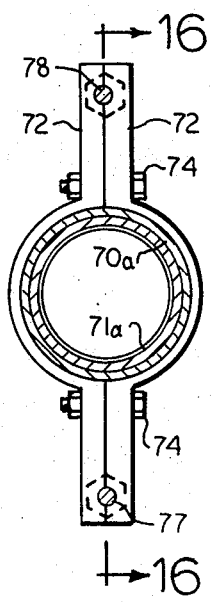
FIG. 17 is a sectional view taken along line 17—17 of FIG. 16.

In the arrangement shown in FIGS. 16 and 17 two titanium tubes 70 and 71 to be joined by LID bonding in accordance with the invention are prepared with the end portion 70a of the tube 71 tapered to fit closely within the flared end portion 70a of the other tube 70. The faying surface of either or both of the tubes is prepared and plated with a selected metal or metals as set forth previously herein, and the parts are clamped together in co-axial relation in any suitable manner. The simple clamping means illustrated comprises two pairs of clamp brackets 72 and 73, each comprising a pair of similar bracket half portions bolted together by bracket bolts 74 to grip their respective tubes 70 and 71. Registering notches in the bracket half members provide holes for the insertion of clamp bolts 77 and 78 of a metal having a suitable coefficient of thermal expansion by means of which the tubing members 70 and 71 are urged co-axially together to exert desired pressure on the faying surfaces with their interposed plating material. The LID bonding of the parts at their faying surfaces is then accomplished by heating the assembled parts in an inert atmosphere or hard vacuum as set forth in detail previously herein for honeycomb core sandwich panels.

Figure 18:
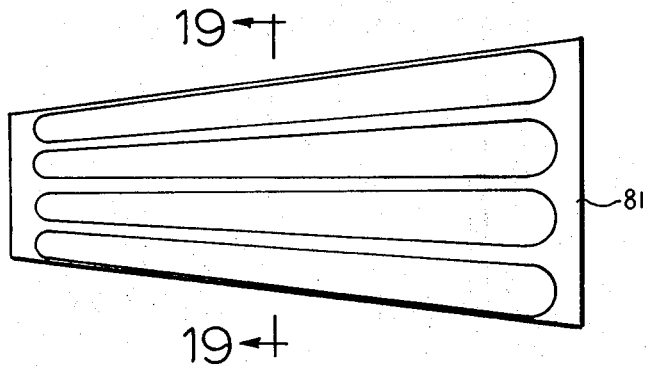
FIG. 18 is a sectional view taken along line 18—18 of FIG. 19 and shows one of the two fitted titanium forgings which are to be diffusion bonded together in accordance with the present invention to form a vented turbine blade.
Figure 19:
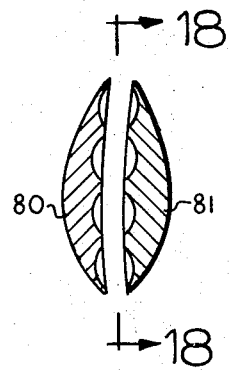
FIG. 19 is a sectional view taken along line 19—19 of FIG. 18 showing the two blade forgings spaced slightly apart.

FIGS. 18 and 19 show two forgings 80 and 81 machined to comprise the two halves of a turbine blade, and with the unrecessed portions of their inner faces machined for close fitting engagement with each other. The two parts 80 and 81 are cleaned and the faying surface of either or both parts is plated as set forth previously herein. The two blade half portions 80 and 81 are then clamped or otherwise secured together with their faying surfaces in contact with each other and are subjected to required pressure by suitable or conventional means. They are then heated in the manner set forth previously herein to integrally bond the two blade portions 80 and 81 together as set forth previously herein by diffusion bonding across the atomic bridge provided by the liquid interface of the melted plating material.

Figure 20:
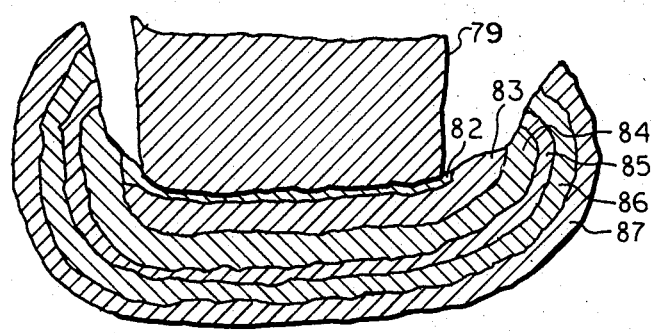
FIG. 20 is a greatly enlarged, fragmentary, sectional micrograph of an edge portion of a honeycomb core member showing successive platings of different metals in a preferred sequence for forming the liquid interface on at least one of the faying surfaces to be joined by means of the present invention.

A preferred sequence for the plating of a selected series of metals for practicing the invention is shown in FIG. 20, which is a drawing of a greatly enlarged micrograph of the edge portion of a ribbon 79 of 0.003 inch foil with the successive platings thereon. These platings comprise a first flash coating 82 of Cu, followed in sequence by layers of 83 Ni, 84 Cu, 85 Ag, 86 Cu and 87 Ni. The proportionate total amounts of the plating metals are Cu 38%, Ni 38% and Ag 24%. The total thickness of the interface plating preferably should be no greater than is required to fill the voids between the faying surfaces at the existing pressure when the interface plating material reaches liquidus, since in that case the atomic bridging provided by the liquid interface material is adequate, and dilution by the interface material is minimal.

The invention provides a method for the diffusion bonding of titanium which obviates the necessity for distortion of the basis metals by either creep or yield stress, and which can be accomplished at less cost and in less time than has heretofore been possible.

Having thus disclosed the invention, what is claimed as new and useful and desired to be secured by U.S. letters Patent is:

1. A liquid interface diffusion bonded structure comprising a titanium honeycomb core and a titanium facing sheet bonded thereto, the region of the bonded joint therebetween comprising grain growth of the basis titanium as a result of atomic diffusion and atomic transport of said basis titanium across the joint and dilution within said region of the bonded joint of the braze type materials comprising copper of the order of 38 percent, nickel of the order of 38 percent, and the balance silver and adding from 1 to 5 grams per square foot of the bonded structure, the facing sheet, other than in the region of the joint, being free of the braze type materials.

* * * * *